Patented Dec. 29, 1942

2,306,451

UNITED STATES PATENT OFFICE 2,306,451

CELLULOSE DERIVATIVES

Leon Lilienfeld, Vienna, Austria; Antonie Lilienfeld, administratrix of said Leon Lilienfeld, deceased, assignor to Lilienfeld Patents Inc., Boston, Mass., a corporation of Massachusetts No Drawing. Application March 27, 1936, Serial No. 71,261. In Great Britain March 29, 1935

1 Claim. (Cl. 260—226)

Alkyl derivatives of cellulose which are soluble in caustic alkali solution but which are insoluble or scarcely soluble in water and processes for making same and processes for converting them into shaped structures are for the first time described in my U. S. Patents Nos. 1,589,606, 1,683,831, 1,683,682 and in my British Patent 374,964.

Furthermore, hydroxy-alkyl derivatives of cellulose which are soluble in caustic alkali solution but which are insoluble or only scarcely soluble in water, and processes for making same and processes for converting them into shaped structures are for the first time described in my U. S. Patents Nos. 1,722,927 and 1,722,928.

Finally, hydroxy-paraffin-mono-carboxylic acid derivatives of cellulose which are soluble in caustic alkali solution but which are insoluble or only scarcely soluble in water, and processes for making same and processes for converting them into shaped structures are for the first time described in my U. S. Patents Nos. 1,682,292, 1,682,294 and 1,682,293.

According to the working formulae used for their preparation, inter alia according to the degree of maturing given the alkali cellulose and/or the time of the reaction and/or the time allowed the reaction mass to stand before the reaction mass is worked up and/or the temperature at which the reaction is conducted and/or to the proportions of the alkylating or hydroxy-alkylating agents or halogen fatty acids (etherifying agents) used for the reaction, in my aforementioned processes cellulose derivatives form which either (a) Will completely dissolve in caustic alkali solution at room temperature, or (b) Will only incompletely dissolve therein, or (c) Will not dissolve at all or to any substantial extend in caustic alkali solution at room temperature.

Among the members of group (b) the proportion of the part which will dissolve in caustic alkali solution at room temperature to the part which will not dissolve in caustic alkali solution at room temperature, varies in my aforementioned processes within very wide limits, for instance between 40–90 per cent. of the part that will dissolve to 60–10 per cent. of the part that will not dissolve, (see for example the relative examples of my U. S. Patents 1,683,831 and 1,683,682) and in many instances even between 10–20 per cent. of the product will dissolve, and 90–80 per cent. of the product will not dissolve, in caustic alkali solution at room temperature.

The members of group (b) may therefore, by soaking them in caustic alkali solution at room temperature and filtration, straining, centrifuging or the like, be separated into their constituents which will directly dissolve in caustic alkali solution at room temperature and their constituents which will not directly dissolve in caustic alkali solution at room temperature, or they may be brought wholly into solution in caustic alkali solution at room temperature, indirectly, according to the process laid down in my British Specification No. 212,864, i. e., by contacting them with caustic alkali solution and cooling the thus obtained mixture to a temperature between plus 5° C. and minus 10° C. or lower and thereafter bringing the solution back to room temperature. (See for instance page 3 lines 62 to 71 of my British Specification No. 212,864, where the making of solutions of alkali-soluble cellulose ethers by refrigeration is described for the first time.)

As a matter of course, the process of my British Specification No. 212,864 can be also used for the dissolving of the members of group (c) in caustic alkali solution.

The products of the processes described in the specifications set forth in the first three paragraphs of this specification are also soluble in the known solvents for cellulose, such as strong organic bases in presence or absence of caustic alkali (see my U. S. Patent No. 1,771,460), or ammonia derivatives of carbon dioxide or of sulphurated carbon dioxide in presence of caustic alkali (see my U. S. Patent No. 1,771,461), or cuprammonium solution or zinc chloride solution or calcium thiocyanate solution or the like.

Now, in continuing my researches on my alkali-soluble, water-insoluble cellulose ethers, I have discovered that technically valuable cellulose derivatives which are at least partially soluble in caustic alkali solution but which are insoluble or other scarcely soluble in water are obtained when cellulose is treated simultaneously or consecutively in either order with an ethylating agent at a raised temperature and with a hydroxy-alkylating agent, in the presence of an amount of caustic alkali smaller than the weight of water present. The treatment with the hydroxy-alkylating agent may be conducted at a raised temperature or at normal temperature or below normal temperature, for example at 10° C.

The technical advance marked by the invention consists further in the feature that the products prepared thereby can be worked up into shaped structures (such as film, threads, coatings of all kinds, etc.) which excel by great pliability and/or flexibility, and at very good dry and wet tenacity.

In many cases, the shaped structures, such as artificial threads, film, coatings of all kinds, finishing and sizing of textiles, etc. considerably surpass with regard to their dynamometric properties, shaped structures produced from such simple ethyl derivatives of cellulose or hydroxy-alkyl derivatives of cellulose as are made under the same working conditions.

Furthermore, many cellulose derivatives produced according to the present invention are, with regard to their solubility, superior to the simple cellulose derivatives produced under the same working conditions by means of the same ethylating agent or the same hydroxy-alkylating agent. It is not a rare occurrence that an ethyl-hydroxy-alkyl derivative of cellulose prepared according to the present invention will dissolve directly in caustic alkali solution at room temperature or at a temperature between room temperature and 0° C., whilst the simple ethyl derivative of cellulose or the simple hydroxy-alkyl derivative of cellulose prepared under the same working conditions with one only of these etherifying agents, will dissolve therein only at temperatures below 0° C.

A further rather important advance of the present invention is the small tendency of the solutions of the ethyl-hydroxy-alkyl derivatives made according to the present invention towards the formation of bubbles. Thus, for instance, when an ethyl cellulose is prepared by acting upon alkali cellulose with ethyl chloride at an elevated temperature, very often substances result the solutions of which display a pronounced tendency towards forming large amounts of bubbles or even foam, which bubbles or foam are not very easily removable from the solution. When, however, an ethyl-hydroxy-alkyl, for example an ethyl-hydroxy-ethyl derivative of cellulose is produced according to the present invention by acting upon alkali cellulose with ethyl chloride and a hydroxy-alkylating agent, for example ethylene chlorohydrin or ethylene oxide, products result which have only a normal tendency towards forming gas bubbles or foam, both of which being easily removable by storing the solutions at atmospheric or reduced pressure.

The cellulose derivatives prepared according to the invention are suitable for the production of certain derivatives thereof, such as esters and xanthates and the like. The cellulose derivatives made according to the present invention are further useful parent materials for the manufacture of water-soluble cellulose ethers or of such cellulose ethers as are soluble in organic solvents.

The cellulose derivatives produced according to the invention have the same or similar solubility relationships as the alkali-soluble cellulose derivatives which are made according to the processes described in my specifications set forth in the first three paragraphs of the present specification. In other words: Most of them are at least partially soluble in caustic alkali solution, but insoluble or only scarcely soluble in water. Like the cellulose derivatives manufactured according to the processes of the aforementioned specifications they either (a) Will directly dissolve completely in caustic alkali solution at room temperature, or (b) Will directly partially dissolve therein, or (c) They will not directly dissolve (or not any substantial part will directly dissolve) in caustic alkali solution at room temperature. The members of group b and the members of group c can be indirectly brought into solution in caustic alkali solution at room temperature, according to the process laid down in my British Specification No. 212,864, i. e., by cooling their suspensions or incomplete solutions in caustic alkali solution to a temperature between plus 5° C. and minus 25° C. and then raising the temperature to room temperature.

Since certain members of groups b and c will completely dissolve in caustic alkali solution at temperatures around 0° C. (for example at 0° C. to plus 5° C.), and, in general, remain dissolved therein when the solutions are allowed to come back to room temperature, whilst other members of these two groups can be brought into solution therein at room temperature only by cooling their suspensions or incomplete solutions in caustic alkali solution to a temperature below 0° C., for example to minus 1 to minus 10° C. or lower, the temperatures used for making the members of group b (or their constituents which will not dissolve at room temperature) soluble in caustic alkali solution vary within wide limits. This also applied to group c.

As a matter of course, if desired, also the members of group a can be dissolved by cooling to a temperature coming within the scope of the temperatures characteristic of the process of my British Specification No. 212,864.

The working up of the alkali-soluble cellulose derivatives prepared according to the present invention into shaped structures may be effected for example by coagulating their shaped solutions (if desired or expedient after drying them) by means of any precipitating bath (or combination of two or more precipitating baths) known from the viscose art, or even by means of solutions of neutral inorganic or organic salts (for example sodium chloride or sodium sulphate or magnesium sulphate or sodium acetate or sodium oxalate or the like) or a mixture of one or more neutral salts or by means of organic acids (such as acetic acid or oxalic acid or even tannic acid or the like) or by means of weak inorganic acids (such as carbonic acid or boric acid) or by means of an alcohol or of formaldehyde solution etc.

In certain cases, particularly in cases in which small amounts of etherifying agents are used or in which the temperature of the reaction between the alkali cellulose and the etherifying agent is too low to ensure the production of an alkali-soluble derivative or in which the proportion of caustic alkali to water and/or to cellulose is very low, products are obtained which are insoluble or only partially soluble in caustic alkali solution even at temperatures below 0° C. It is true that these cellulose derivatives or at least their constituents which are insoluble in caustic alkali at any temperature are per se unsuitable for technical purposes. However, they are capable of being converted into valuable xanthates according to the methods described below and illustrated by examples.

As stated above, the present invention comprises treating cellulose with both at least one ethylating agent at a raised temperature and at least one hydroxy-alkylating agent at any suitable temperature, in the presence of an amount of caustic alkali smaller than the weight of water present.

The incorporation of the alkali and water with the cellulose may be effected in a variety of ways of which the following few examples (to which the invention is not limited) are given:

(a) Cellulose is steeped in caustic alkali solution and the excess removed, if desired after storing, by pressing, centrifuging, suction, filtration, etc., until the residue has the desired alkali- and water-content.

(b) Cellulose is steeped in caustic alkali solution of a strength which, after removal of a certain part of the caustic alkali solution by pressing, centrifuging or the like, will allow the contemplated amount of the caustic alkali to remain with the cellulose, but which will leave in the cellulose an amount of water which is larger than is intended in the alkali cellulose. This excess of water is thereafter driven off by drying at atmospheric or reduced pressure at room temperature or below room temperature or at a raised temperature (for example 60° C.) or by distillation with benzol or the like until only the desired quantity of water remains.

(c) Cellulose is impregnated or mixed with so much caustic alkali solution of appropriate strength as to yield an alkali cellulose which from the beginning contains the desired amounts of caustic alkali and water.

(d) Cellulose is mixed with so much solid caustic alkali or a mixture of solid caustic alkali and saturated caustic alkali solution as will leave in, or with, the cellulose the contemplated amount of caustic alkali but no water or less water than intended. The missing amount of water is added during or after the mixing operation or the mixture is permitted to absorb the desired quantity of water during or after the mixing operation.

Wherever the context permits, the products obtainable by the methods a to d will be called in this specification "alkali cellulose."

The alkali cellulose may be caused to react with the ethylating and hydroxy-alkylating agent in its fresh state or after having matured for a shorter (say 12 to 24 hours) or a longer time (say 36 to 144 hours or more). The maturing of the alkali cellulose may be considerably accelerated by effecting it at a temperature above room temperature, for example at 24 to 40° C.

The alkali cellulose may be treated with an ethylating agent and a hydroxy-alkylating agent simultaneously or consecutively in either order.

If the treatment is not simultaneous, the treatment with the ethylating agent is to be conducted at a raised temperature, whilst the consecutive treatment of the hydroxy-alkylating agent may be effected either at a raised temperature or at room temperature or below room temperature.

The amounts of the ethylating and hydroxy-alkylating agents employed in the present process may vary within wide limits.

The ethylating and/or hydroxy-alkylating agents may be employed in the undiluted state or diluted with a suitable diluent (for example benzol or chlorbenzol or ethyl ether or the like).

The reaction may also be conducted in presence of a catalyser, such as a small quantity of a copper salt or nickel salt or iron salt or a peroxide, such as benzoyl peroxide.

In order to work up the reaction mixture after the reaction is completed, the reaction mixture is either dissolved as such by the addition of water (when unused alkali is present in sufficient quantity), or of a solution of caustic alkali of appropriate strength, and is put to the technical use contemplated, if necessary after previously filtering, straining through cloth or centrifuging. Or the final product is isolated, for example by merely washing the reaction mass with water or another solvent for alkalies and salts (for instance aqueous alcohol). The washing may also be preceded by neutralisation of the alkali present in the reaction mass, or by acidification of the reaction mass.

The washed product of the reaction may then be either directly dissolved in caustic alkali solution and the solution worked up into some shaped structure, or dried and thereafter dissolved in caustic alkali solution and the solution worked up into a shaped structure.

It is self-evident that, regardless of whether the crude, i. e., unwashed reaction mass or the washed product of the reaction or the washed and dried product of the reaction is brought into solution in caustic alkali solution, in the event of the product not being capable of directly dissolving in caustic alkali solution at room temperature, the dissolving may be effected according to the process described in my British Specification No. 212,864, i. e., by cooling the solution or suspension of the crude or washed product in caustic alkali solution to a temperature beteween plus 5° C. to 0° C. (if the product will dissolve sufficiently readily soluble at a temperature lying between these two boundaries) or at a temperature below 0° C., for example to minus 5 or minus 10° C. or lower (if the product will not readily dissolve (wholly or mostly) at any temperature between room temperature and 0° C.) and thereafter allowing the temperature to rise to 0° C. or to a temperature between 0° C. and room temperature or to room temperature.

If the unwashed or washed product of the reaction will directly dissolve in caustic alkali solution at room temperature, it may be dissolved at room temperature or, if desired, according to the process described in my British Specification No. 212,864.

In all cases in which the product of the reaction is not capable of being directly dissolved by caustic alkali solution at room temperature, the portion thereof which will so dissolve may be isolated, i. e., separated from the portion that will not so dissolve, for example in the following manner: The crude or washed reaction mass is soaked in caustic alkali solution (or in water if enough alkali is present to dissolve the reaction product) the solution is freed from the undissolved constituents by filtering, straining, centrifuging or the like, and then mixed with an acid, an acid salt or a neutral salt or any other substance capable of precipitating the part of the product of the reaction which is dissolved in the caustic alkali solution. The thus obtained precipitate is thoroughly washed and, if desired, dried. The drying may also be preceded by a dehydration with alcohol. As a matter of course, the constituents which are not capable of dissolving directly in caustic alkali solution at room temperature and which have been separated from the constituents that have been so dissolved in caustic alkali solution at room temperature may be dissolved in caustic alkali solution according to my British Specification No. 212,864.

The conversion of the cellulose derivatives prepared according to the present invention into shaped structures, for example artificial threads, film, coatings of any kind and the like, is effected, for example, by bringing a solution of a cellulose derivative made in accordance with the invention, into the desired shape and acting upon the thus shaped solution with a coagulating agent, for example one of the coagulating baths set forth above.

The cellulose derivatives produced according to the present invention may be worked up into shaped structures also in such a manner that their shaped solutions are contacted with an agent or agents which has or have a coagulating effect on the shaped solution and a plasticising effect on the freshly coagulated material. As coagulating and plasticising agents, baths containing at least 25 per cent. of sulphuric acid monohydrate (for example 25 to about 70 per cent. of sulphuric acid monohydrate), or such a proportion of another strong mineral acid as will produce an effect in the manufacture of shaped structures similar to that given by sulphuric acid containing at least 25 per cent. of sulphuric acid, have proved suitable. The coagulating and plasticising of the shaped solution may also be effected in two steps by acting upon the shaped solution first with one or more agents which have a coagulating but no plasticising or only little plasticising effect on the shaped solution and then with one or more agents (for example strong mineral acids, particularly strong sulphuric acid) which have a plasticising effect on the freshly coagulated material.

As far as supportless artificial structures, such as artificial threads, artificial hair, artificial straw, film, bands, strips or the like are concerned, the shaping and coagulating may be effected by extruding the cellulose derivative solutions or cellulose derivative xanthate solutions through suitably formed openings into a coagulating bath. In case of such shaped structures as are combined with a rigid or pliable support, such as coatings, layers and impregnations of any kind, dressing of fabrics, textile printing, book-cloth, tracing cloth, sizing of yarn, papersizing, paper-like surfacing, etc., the shaping and coagulating may be accomplished by wholly or partially coating, impregnating, printing or otherwise covering or imbueing with the cellulose derivative solution or cellulose derivative xanthate solution a rigid or pliable support and, with or without intermediate drying, treating the material with a coagulating bath by either introducing the material into a coagulating bath or conducting the material through a mist of the coagulating bath or by any other method of applying a liquid to a rigid or pliable support.

As mentioned above, the cellulose derivatives prepared according to the present invention can, by any process or method known in the cellulose chemistry, be converted into various derivatives, such as esters of inorganic or organic aliphatic or aromatic acids, for example nitrates, phosphates, formates, acetates, propionates, benzoates or into sulphonated derivatives or derivatives containing nitrogen, such as nitriles or cyanogen or cyanuric derivatives.

The conversion of the cellulose derivatives produced according to the present invention into water-soluble cellulose ethers or such cellulose ethers as are insoluble in water, but soluble in organic solvents can be effected by treating the cellulose derivatives either in the dissolved state or in the solid state with further amounts of caustic alkali and etherifying agents, for example according to the process and methods described in my U. S. Patents Nos. 1,188,376, 1,483,738 and 1,589,607 or by any other process or method for making from cellulose derivatives of low degrees of alkylation, water-soluble cellulose ethers or cellulose ethers which are soluble in volatile organic solvents.

The xanthates of the cellulose derivatives made according to the present invention are of technical interest. For, the shaped structures (for example film, threads, coatings of any kind, finishings of textiles, etc.), produced therefrom have unusually valuable properties.

The xanthates of the cellulose derivatives made according to the present invention can be produced by acting on the cellulose derivatives with carbon bisulphide in the presence of alkali. The carbon bisulphide may be caused to act either upon the cellulose derivatives in the solid form in presence of caustic alkali solution, for example upon a moist alkali compound of a cellulose derivative or upon a mixture of a cellulose derivative with caustic alkali solution or upon a suspension of a cellulose derivative in caustic alkali solution or upon a solution of a cellulose derivative in caustic alkali solution, which solution, as the case may be, can be prepared at room temperature or according to the process described in my British Specification No. 212,864.

The conversion of the cellulose derivatives produced according to the present invention into their xanthates may be carried out in various ways. Some of these methods are described in the following lines by way of examples to which, however, the present invention is not limited. Since, in many cases, the combination of the preparation of the parent cellulose derivative to be xanthated with the xanthating into a continuous operation or into a sequence of operations, presents some advantages, also some examples for the preparation of the starting cellulose derivatives are included in the following description.

FIRST METHOD

A cellulose derivative prepared according to the present invention is, according to any of the methods known in the viscose art for the production of alkali cellulose, converted into its alkali compound, the alkali compound treated with carbon bisulphide at room temperature or at a temperature between room temperature and 0° C. or at 0° C. or at a temperature below 0° C., the thus obtained xanthate dissolved in water or in a caustic alkali solution at room temperature or a temperature between room temperature and 0° C. or at 0° C. or at a temperature below 0° C. and thereafter put to technical use.

SECOND METHOD

A cellulose derivative prepared according to the present invention is dissolved in caustic alkali solution (according to its solubility relationships either at room temperature or at a temperature between room temperature and 0°C. or at 0°C. or at a temperature below 0°C.) or suspended therein, whereupon the thus obtained solution or suspension is treated with carbon bisulphids at room temperature or at a temperature between room temperature and 0°C. or at 0°C. or at a temperature below 0°C.

THIRD METHOD

Cellulose is acted upon in presence of an amount of alkali smaller than the weight of water present, simultaneously or consecutively in either order with an ethylating agent and a hydroxy-alkylating agent, whereupon the resultant reaction mass is washed and thereafter treated with caustic alkali in the form of caustic alkali solution or of solid caustic alkali or of a mixture of solid caustic alkali and caustic alkali solution and with carbon bisulphide, the latter being added either simultaneously with the caustic alkali or after a shorter or longer period of time calculated from the contacting of the washed reaction mass with the caustic alkali. The treatment with the carbon bisulphide and/or the dissolving of the final xanthate in water or caustic alkali solution may be conducted at room temperature or at a temperature between room temperature and 0°C. or at 0°C. or at a temperature below 0°C.

Fourth Method

Cellulose is acted upon in presence of an amount of alkali smaller than the weight of water present, simultaneously or consecutively in either order with an ethylating agent and a hydroxy-alkylating agent, the resultant reaction mass, without being washed, is exposed to the action of a further quantity of caustic alkali in the form of caustic alkali solution or of solid caustic alkali or of a mixture of caustic solution and solid caustic alkali and finally contacted with carbon bisulphide which is added either simultaneously with the caustic alkali or after a shorter or longer period of time calculated from the contacting of the unwashed reaction mass with the caustic alkali. The treatment with the carbon bisulphide and/or the dissolving of the final xanthate in water or caustic alkali solution may be conducted at room temperature or at a temperature between room temperature and 0°C. or at 0°C. or at a temperature below 0°C.

Fifth Method

Cellulose is acted upon in presence of an amount of alkali smaller than the weight of water present, simultaneously or consecutively in either order with an ethylating agent and a hydroxy-alkylating agent and the resultant reaction mass, without being washed and without being supplied with a fresh amount of caustic alkali, optionally after having matured for a longer or shorter time, treated with carbon bisulphide. The treatment with the carbon bisulphide and/or the dissolving of the final xanthate in water or caustic alkali solution may be conducted at room temperature or at a temperature between room temperature and 0°C. or at 0°C. or at a temperature below 0°C.

Sixth Method

Cellulose is acted upon in presence of an amount of alkali smaller than the weight of water present simultaneously or consecutively in either order with an ethylating agent and a hydroxy-alkylating agent, whereupon the resultant reaction mass is washed and (if desired, after being dried) brought into contact with a caustic alkali solution of such strength that the quantity added to the washed product of the reaction together with the water (if any) contained therein will bring about such proportion of water, caustic alkali and cellulose derivative produced according to the present invention as is desired in the solution or paste intended for technical use. Thereafter, the solution or paste or suspension which may or may not be cooled down to a temperature between room temperature and 0°C. or to 0°C. or to a temperature below 0°C., is acted upon with carbon bisulphide, the reaction with carbon bisulphide being conducted either at room temperature or at a temperature between room temperature and 0°C. or to 0°C. or at a temperature below 0°C.

Seventh Method

Mode of procedure as in the Sixth method, but with the difference that, before being contacted with the caustic alkali solution, the resultant reaction mass is not washed. As a matter of course, in this case the amount of caustic alkali (if any) contained in the reaction mass, is to be taken into account when the strength of the caustic alkali solution is calculated.

The foregoing methods are applicable to such cellulose derivatives produced according to the present invention as are soluble or only partially soluble or insoluble in caustic alkali solution, whilst the following method is only suitable for such cellulose derivatives produced according to the present invention as are soluble in caustic alkali solution.

Eighth Method

Cellulose is acted upon in presence of an amount of alkali smaller than the weight of water present, simultaneously or consecutively in either order with an ethylating agent and a hydroxy-alkylating agent, and the product of the reaction isolated from the reaction mass by dissolving the latter, if desired after washing, in dilute caustic alkali solution at room temperature or at a temperature between room temperature and 0°C. or at 0°C. or at a temperature below 0°C., if necessary freeing the thus obtained solution from undissolved particles by filtration, centrifuging, settling and decanting or the like and precipitating the dissolved cellulose derivative by means of an acid substance or by means of a salt or a dehydrating agent such as alcohol or by means of any other suitable precipitating agent. The so isolated cellulose derivative is (if desired after being washed and, if desired dried) thereafter redissolved in caustic alkali solution and subjected to the action of carbon bisulphide.

It is desired to state expressly that it is not intended to limit the invention to the foregoing methods of carrying it out, and, in addition, that the xanthates of the alkali-soluble or alkali-insoluble cellulose derivatives produced according to the present invention may be prepared according to any process or method available for this purpose.

After the treatment with carbon bisulphide the final xanthates may be purified or isolated from the reaction masses, for example, by (optionally after neutralising them with a weak acid, for example acetic acid) precipitating with an alcohol, such as methyl- or ethyl-alcohol, or with a solution of a salt, such as sodium chloride or an ammonium salt or the like or with carbon dioxide or with sulphurous acid or with sodium bisulphide; the xanthate may be also purified by dialysis.

In many cases, however, purification or isolation is unnecessary, since the crude reaction masses are readily soluble in caustic alkali solution and yield solutions that contain little or no undissolved particles.

The xanthates of the cellulose derivatives produced according to the present invention are readily soluble in caustic alkali solution and water. On being acidified, they yield coagulates or precipitates which are insoluble in water. With salts or heavy metals, for instance zinc or copper, they yield salts of such metals.

It is further remarkable that, in contrast to cellulose itself, the xanthate reaction takes easily place in presence of dilute alkali solutions.

The xanthates of the cellulose derivatives prepared according to the present invention may be worked up into artificial materials, for instance threads or film or coatings or layers of any kind or impregnations of any kind alone or in conjunction with other colloids, such as cellulose xanthate. Such combination with cellulose xanthate may be effected by mixing a solution of a xanthate of the cellulose derivatives prepared according to the present invention with viscose, or by dissolving cellulose xanthate (sulphidised alkali cellulose) in a solution of a xanthate of a cellulose derivative produced according to the present invention or by dissolving a xanthate of a cellulose derivative made according to the present invention in viscose, or by conducting the xanthation so, that the carbon bisulphide is allowed to act in presence of caustic alkali upon a mixture of a cellulose derivative produced according to the present invention and cellulose, for example by treating an alkali cellulose containing an amount of caustic alkali smaller than the weight of water present simultaneously or consecutively in either order with an ethylating agent and a hydroxy-alkylating agent under such conditions that only part of the cellulose contained in the alkali cellulose is converted into the corresponding cellulose derivative and thereafter, by acting upon with carbon bisulphide, converting the thus obtained reaction mass into a mixture of a xanthate of the corresponding cellulose derivative with cellulose xanthate. Also other alkali-soluble derivatives of cellulose or alkali-soluble cellulose hydrates or proteins or gelatine may be used as admixtures to the xanthates of the cellulose derivatives produced according to the present invention.

Any suitable softening agents, such as glycerine or a glycol or a sugar, such as glucose or a soap or Turkey-red oil, or a drying or non-drying oil, or a halogen derivative of a di- or polyvalent alcohol, particularly a halohydrin, such as a dichlorohydrin or a mono-chlorohydrin or ethylene chlorohydrin may be added to the solutions of the xanthates of the cellulose derivatives produced according to the present invention.

With regard to the carrying out of the present invention in practice, it is impossible to indicate every condition for success in every particular case and it is to be understood that preliminary experiments cannot be avoided to find what are the conditions necessary for success when using a particular kind of cellulose, a particular method of incorporating the alkali with the cellulose and a particular etherifying agent.

In order to explain the nature of the present invention, the following specific examples are set forth. It is to be understood that the invention is not limited to these examples, to the precise proportions of ingredients, the times and temperatures and sequence of steps set forth; the parts are by weight:

*Example IA to H*

A. 1000 parts of air-dry cotton linters or woodpulp are steeped in 10,000 to 20,000 parts of caustic soda solution of 18 per cent. strength at 15 to 20° C. and the mixture allowed to stand at 15 to 20° C. for 1 to 24 hours. The resulting mass is then pressed to 3000 to 3400 parts and comminuted at 10 to 18° C. for 2 to 3 hours in a Werner-Pfleiderer shredder or another suitable comminuting machine, or in a Werner-Pfleiderer xanthating machine whose blades may be dentated. Thereupon the alkali cellulose is placed in a rotating autoclave or an autoclave with a stirring device, 200 to 1000 parts of pre-cooled ethyl chloride and 100 to 200 parts of ethylene chlorohydrin or 55 to 110 parts of ethylene oxide are added, and the material is heated to 30 to 95° C. and kept at this temperature for 12 to 24 hours.

B. The process is carried out as in Example A, but with the difference that the reaction is conducted without extraneous supply of heat.

When the reaction is completed, the product of the reaction contained in the reaction mass A or B can be brought into solution in various ways, the more important being the following:

(a) The crude reaction mass is, without being washed or otherwise treated, mixed with such quantity of a caustic soda solution of appropriate strength as to yield a solution or suspension containing about 4 to 8 per cent. of the product of the reaction and 6 to 10 per cent. of caustic soda.

The product of the reaction is brought into solution either at room temperature or at a temperature between room temperature and 0° C. or 0° C. or according to the process described in my British Specification No. 212,864, i. e., by cooling to a temperature below 0° C., for example to a temperature of about minus 5 to minus 10° C. a mixture of the product of the reaction and caustic soda solution of 6 to 9 per cent. strength (which mixture, according to the strength of the caustic soda solution and/or to the nature and quantity of the etherifying agent used and/or the amount of salt contained in the reaction mass and/or the time and temperature of the reaction and/or the time of having been in contact with the caustic soda solution, may be a suspension of the undissolved product of the reaction in the caustic soda solution or a suspension of the undissolved constituents of the product of the reaction in the solution of its dissolved constituents or a solution containing only a small amount of undissolved fibres) and, optionally after having kept the frozen or partially frozen mass at this temperature for some time, bringing it back to room temperature. Or (b) the crude reaction mixture as such or after having been neutralised or acidified is washed with water and then preferably pressed and either stored or (preferably, after the water content of the pressed product has been determined) directly mixed with so much caustic soda solution of appropriate strength as to yield a suspension or solution containing about 4 to 8 per cent. of the product of the reaction and 6 to 10 per cent. of caustic soda. Also in this case, if necessary, the complete solution may be brought about by cooling the mixture to a temperature between room temperature and 0° C. or to 0° C. or to a temperature below 0° C., for example to a temperature of about minus 5 to minus 10° C., and bringing the solution back to room temperature or to any temperature between 0° C. and room temperature.

The washed and, preferably, pressed reaction mass may also be dried and then dissolved as described above.

(c) The product of the reaction may also be purified, for example in the following manner:

It is brought into a very dilute (for example 1 to 2 per cent.) solution in caustic soda solution of 6 to 10 per cent. strength either by dissolving it direct in caustic soda solution at room temperature or between room temperature and 0° C. or at 0° C. or according to the process described in my British Specification No. 212,864, i. e. by refrigerating and thawing, or by diluting the solution obtained according to the method described above under *a* or the method described above under *b*. The thus obtained dilute solution is now, if necessary after being freed from any undissolved particles by filtration or the like, precipitated by means of an acid (for example sulphuric acid or hydrochloric acid or acetic acid) or by a salt, such as sodium chloride or sodium sulphate or the like.

The precipitate thus obtained is separated from the mother liquor and either directly dissolved in 6 to 10 per cent. caustic soda solution at room temperature or at a temperature between 0° C. and room temperature or at 0° C. or at a temperature below 0° C., or, if desired after being previously dehydrated with alcohol and, if desired exhausted with ether, dried and thereafter dissolved.

The solutions obtained according to methods *a* to *c* may be, if necessary after being filtered, converted into various shaped structures, the production of a few shaped structures being illustrated by way of the following examples to which the invention is not limited, since they are far from covering all kinds of shaped structures producible from the solutions of the products of the present invention.

(1) The solution is extruded through a suitable hopper or slit into a suitable precipitating or coagulating bath, for example any coagulating bath known from the viscose art, such as a 20 to 30 per cent. solution of ammonium sulphate or ammonium chloride or sodium chloride, or sulphuric acid of 10 to 20 per cent. strength, or a bath containing 10 to 16 per cent. of sulphuric acid and 20 to 25 per cent. of sodium sulphate, or a solution containing 10 to 16 per cent. of sodium sulphate, 14 to 30 per cent. of magnesium sulphate and 2 to 12 per cent. of sulphuric acid etc. etc.

To all the foregoing coagulating baths a certain quantity of an organic substance, for example 10 per cent. of glucose or glycerine and also some (for example 1 to 2 per cent.) zinc sulphate may be added.

The solution of the cellulose derivative may also be caused to enter a solution of a salt, for example a 25 per cent. solution of ammonium sulphate and be then conducted from the salt solution bath into an acid bath, for instance into any one of the acid baths set forth above by way of example.

The coagulating bath may be used at room temperature or below room temperature for example at 4 to 8° C. or at a raised temperature, for example at 35 to 45° C. or more.

The solidified film is washed with water and, optionally after having been contacted with a dilute solution of a substance having alkaline reaction, such as dilute ammonia solution or a dilute solution of $Na_2CO_3$ or $NaHCO_3$ or the like and re-washed, dried in the usual manner.

The spinning into film and/or drying of the film may be conducted without any additional stretch or with more or less additional stretch.

The film may be treated before or after drying with an aqueous solution of glycerol (for instance of 4 to 5 to 10 per cent. strength), or glycol in order to increase its flexibility.

As a matter of course, the film may also be treated with any of the known moisture-proofing or water-proofing agents or compositions.

The film may be treated either in the course of its manufacture or in the finished state with a hardening agent, such as formaldehyde or the like.

The manufacture of narrow strips and artificial straw or bands follows automatically from the foregoing example.

(2) A solution prepared according to any one of the methods *a* to *c* is extruded through spinning nozzles into any coagulating or precipitating bath known in the viscose silk art, for example into one of the precipitating or coagulating baths or combinations of two baths referred to in (1).

The solidified thread is thoroughly washed with water and dried in the usual manner.

The spinning operation may be conducted with or without additional stretch which may be effected, for example, by introducing into the path which the thread travels from the spinning nozzle to the collecting device, such as bobbin or centrifuge, one or more brakes, such as godets or differential rollers, or glass or metal rods arranged angularly to each other or the like. Additional stretch can be given the thread also by a high speed of spinning, for example of 80 to 100 meters or more per minute.

The artificial threads may be treated either in the course of their manufacture or in the finished state with a hardening agent, such as formaldehyde or the like.

(3) A mixture of 50 parts of viscose (prepared in the usual manner and containing 6 to 10 per cent. by weight of cellulose) and 50 parts of a solution prepared according to any one of methods *a* to *c* is spun into film or artificial threads as in (1) or (2).

(4) The process is conducted as in (1) or (2) or (3), but with the difference that a bath is used which has a plasticising effect on the freshly coagulated material, for example sulphuric acid of 25 to 70 per cent. strength or another mineral acid, such as hydrochloric acid or phosphoric acid or nitric acid of a strength exerting a plasticising action on the freshly coagulated film or thread, equivalent to the plasticising action of sulphuric acid of 25 to 70 per cent. strength, or a strong zinc chloride solution free from, or containing, some hydrochloric acid or one of the plasticising baths referred to in my British Patent 393,932.

The plasticising may be effected by means of one bath or of two baths. In other words: The solution may be extruded directly into a bath which has a coagulating effect on the shaped solution and a plasticising effect on the freshly coagulated film or thread (for example one of the plasticising baths set out above) or it may be extruded into a bath which has no or only little plasticising effect on the shaped solution (such as one of the baths set out in (1) or (2)) and conducted from there into a plasticising bath (for instance one of the plasticising baths set forth above).

As a matter of course, also such film or threads as have a reduced lustre or are entirely dull can, by any method known from the artificial silk art, be produced from the solutions obtained according to any of the methods *a* to *c*. The same holds good with threads in which gas bubbles or hollow spaces are distributed.

Examples for the manufacture of staple fibre follow automatically from the foregoing.

(5) A woven fabric, such as a cotton fabric is provided by means of a suitable machine, such as a back-filling machine or a padding machine or a spreading machine, with one or more coatings of a solution prepared by any one of the methods *a* to *c*, to which solution a filling material such as talc or china clay or zinc white or a dyestuff or pigment, such as a lake or lampblack or ocher or mica and/or a softening agent, for instance an oxy-trimethylene-sulphide—see my British Specification No. 25,246/1911—or a soap or Turkey-red oil or a drying or non-drying oil, etc., may be added. The coated or impregnated or filled material is then introduced directly or after intermediate drying and/or steaming, into a precipitating bath as referred to in (1) or (4) and is then washed and dried.

The textile material may be treated before or after drying with a softening agent, such as a soap or Turkey-red oil or glycerol or the like.

(6) The procedure is as in (5), but with the exception that the solution is mixed with a solution of starch or dextrin or any other colloid known in the finishing art.

(7) The process is conducted as in (5) or (6), but with the exception that measures are taken towards incorporating with the final material deposited in or on the fibres of the fabric gas bubbles or hollow spaces. This may be done in any known manner either by dispersing or otherwise distributing a gas, such as air or hydrogen or nitrogen or the like, in the solution or by introducing into the solution a substance (for example sodium carbonate or sodium sulphide) which in the subsequent coagulating or precipitating step will evolve a gas.

(8) The process is conducted as in (5) to (7), but with the difference that, before being applied to the fabric, the solution is converted into a lather according to the process described in my British Patent 390,507.

Examples for sizing yarn follow automatically from Examples 5 to 8.

(9) A solution prepared by any one of the methods $a$ to $c$ is mixed with a dye-stuff or with a pigment, such as a lake or orcher or lampblack or zinc white or finely divided mica or a bronze powder free from aluminium and then printed in a rouleaux printing machine or stencilled on a cotton fabric. After being printed, the cotton fabric is, if desired after being dried, introduced into one of the non-plasticising or plasticising baths or combinations of baths set forth under (1) and (4) and, after having been run through the bath or the baths, washed and dried.

(10) A solution prepared according to any one of the methods $a$ to $c$ may be used also for the pasting together of two or more sheets of paper or card boards or of cotton fabrics, the materials pasted together being then, if desired after intermediate drying, introduced into one of the non-plasticising or plasticising baths or combinations of baths set out above under (1) and (4).

(11) Thick plates can be made by accordingly shaping concentrated solutions or pastes of the products of the reaction and, optionally after intermediate drying, treating them with one of the precipitating baths or combinations of precipitating baths set out above under (1) and (4).

As stated above, regardless of whether or not they are soluble or incompletely soluble or insoluble in caustic alkali solution at any temperature (temperatures below 0° C. included) the cellulose derivatives produced according to the present process when treated with carbon bisulphide in presence of alkali yield xanthates convertible into shaped structures which, even when produced by means of non-plasticizing or only little plasticising baths are characterised by unusually excellent dynamometric properties.

In the following lines a few examples are given for the manufacture of xanthates from the products of the present example which, of course, do not exhaust the full range of methods coming into consideration.

X(1). The washed and pressed reaction mass resulting from the treatment of the alkali cellulose with ethyl chloride and the ethylene chlorohydrin or ethylene oxide is, in a suitable machine, for example in a Werner-Pfleiderer xanthating machine whose blades may be dentated or a kneading machine or a shredder or a rotating drum or the like, at 15 to 16° C. well mixed with such an amount of caustic soda and water as, together with the amount of water present in the mass, to contain 10,000 to 20,000 parts of caustic soda solution of 18 per cent. strength.

After having stood at room temperature or thereabouts for 1 to 3 hours, the mass is pressed to 3400 to 4200 parts and then comminuted in a shredder or another suitable comminuting machine for 2 to 3 hours at 11 to 15° C. After shredding 300 to 400 parts of carbon bisulphide are added and the reaction mass treated therewith under kneading or shredding or stirring or otherwise agitating (for instance in a rotating drum) for 2 to 10 hours. The xanthated mass is dissolved in so much water and caustic soda as to yield a solution containing about 6 to 9 per cent. of the dry residue of the washed and pressed mass and 6 to 9 per cent. of caustic soda.

After having been aged at 15 to 18° C. for 48 or 72 or 80 or 100 hours and, during this time, filtered the solution may be worked up into artificial threads or staple fibre or film or strips or artificial hair according to any one of the methods described above under (1) to (4).

The solution may be further used for the dressing or coating or impregnating or printing of fabrics or sizing of yarn according to any one of the methods described above under (5) to (9).

Also a more concentrated solution or paste of the xanthates (for example a 15 per cent. solution in a caustic alkali solution of 7 to 10 per cent. strength) may be prepared, such solution being suitable for making thick plates or adhesives or the like in the manner set out above under (10) and (11).

X(2). The process is conducted as in X(1), but with the difference that, before being dissolved, or at any other stage of the xanthating operation, the reaction mass is cooled down to a temperature between room temperature and 0° C. or to 0° C. or to a temperature below 0° C. for instance to minus 5° C. or minus 10° C. and kept at that temperature with stirring or kneading or otherwise agitating for 20 minutes to 2 hours or longer.

X(3). Mode of procedure as in X(1) or X(2), but with the exception that the dissolving of the xanthated mass in caustic alkali solution is conducted in such a manner that at any stage of the dissolving step, for example at the end of the dissolving step, the complete or incomplete solution is, with stirring or kneading or otherwise agitating, cooled down to a temperature between room temperature and 0° C. or to 0° C. or to a temperature below 0° C., for example to minus 5° C. or minus 10° C. and thereafter brought back to room temperature or to a temperature between 0° C. and room temperature.

X(4). The process is conducted as in any one of the Examples X(1) to X(3), but with the difference that the carbon bisulphide is added to the alkali compound of the cellulose derivative in two portions of 150 to 200 parts, the second portion being added after half of the full time of the xanthation has elapsed.

X(5). The process is conducted as in any one of the Examples X(1) to X(3), but with the difference that, instead of 300 to 400 parts, only 200 parts of carbon bisulphide are used, the age of the xanthated solution at the time of working it up into a shaped structure being 24 to 60 hours.

X(6). The process is conducted as in any one of the Examples X(1) to X(3), but with the difference that, instead of 300 to 400 parts, 140 to 160 parts of carbon bisulphide are used, the age of the xanthate solution at the time of working it up into a shaped structure being 10 to 36 or 48 hours.

X(7). The process is conducted as in any one of the Examples X(1) to X(3), but with the exception that, instead of 300 to 400 parts, 50 to 100 parts of carbon bisulphide are added, the age of the xanthate solution at the time of working it up into a shaped structure being 8 to 30 or 42 hours.

X(8). The process is conducted as in any one of the Examples X(1) to X(7), but with the difference that, instead of being alkalised with an excess of caustic soda solution and then freed from the excess of the caustic soda solution by pressing, the washed and pressed reaction mass is in any suitable apparatus, for example a Werner-Pfleiderer xanthating machine or a Werner-Pfleiderer shredder or a Werner-Pfleiderer kneading machine, mixed with such an amount of caustic alkali solution of appropriate strength as to yield a mixture containing 1000 parts of the dry residue of the washed and pressed reaction product and 1000 to 2400 parts of caustic soda solution of 18 per cent. strength, the xanthating of the thus obtained product and the bringing it into solution being conducted as in any one of the Examples X(1) to X(7).

X(9). The process is conducted as in any one of the Examples X(1) to X(7), but with the difference that, instead of being alkalised with an excess of caustic soda solution and then freed from the excess of the caustic soda solution by pressing, the washed and pressed reaction mass is in a suitable apparatus, for example a Werner-Pfleiderer xanthating machine or a Werner-Pfleiderer shredder or a Werner-Pfleiderer kneading machine, mixed with such an amount of caustic alkali solution of appropriate strength as to yield a mixture containing so much of the dry residue of the washed and pressed reaction product and caustic alkali solution of 18 per cent. strength as, after xanthation (which is performed as described in any one of the Examples X(1) to X(7)) and on addition of an appropriate quantity of water, to yield a solution containing about 6 to 9 per cent. of the dry residue of the washed and pressed reaction product in caustic soda solution of 6 to 9 per cent. strength.

X(10). The process is conducted as in any one of the Examples X(1) to X(9), but with the exception that the reaction mass resulting from the treatment of the alkali cellulose with ethyl chloride and ethylene chlorohydrin or monochlorhydrin or ethylene oxide is, without being washed, alkalised with 6,600 to 13,600 parts of caustic soda solution of 18 per cent. strength at 15° C. and then, by pressing, shredding and sulphidising, worked up into the final xanthate as described in any one of the Examples X(1) to X(9) and the latter into any one of the shaped structures set out above under (1) to (11).

X(11). The crude reaction mass resulting from the treatment of the alkali cellulose with ethyl chloride and ethylene chlorohydrin or ethylene oxide, in which the proportion of caustic soda (which proportion has been determined by titration of the crude reaction mass) is brought (preferably by addition of an appropriate quantity of a strong caustic soda solution, for example of 50 per cent. strength) to such a proportion as, with the caustic soda and water present, to yield 2000 to 2500 parts of caustic soda solution of 18 per cent. strength, is treated with 300 to 600 parts of carbon bisulphide and then worked up into a xanthate in the same manner as the washed and alkalised and pressed reaction mass is xanthated and dissolved in any one of the Examples X(1) to X(9). The thus obtained solutions are then worked up into shaped structures according to any one of the methods described above under (1) to (11).

X(12). The reaction mass resulting from the treatment of the alkali cellulose with ethyl chloride and ethylene chlorohydrin or ethylene oxide is in the crude state or in the washed and pressed state mixed with such an amount of caustic soda solution of appropriate strength as to yield a mixture of 1000 parts of the cellulose derivative contained in the crude reaction mass or of the dry residue of the washed and pressed reaction mas and 15,666 to 11,500 parts of caustic soda solution of 6 to 9 per cent. strength. The mixture is now in a Werner-Pfleiderer xanthating machine or another appropriate machine stirred at room temperature or at any temperature between room temperature and 0° C. or at 0° C. or at a temperature below 0° C. for 20 minutes to 2 hours, whereupon 500 parts (i. e. 50 per cent. calculated on the weight of the cellulose derivative) of carbon bisulphide are added and the mixture kept with stirring or shaking or agitating for 2 to 10 hours at room temperature.

After having been aged at 15 to 18° C. for 90 to 110 hours and after, during ageing, having been filtered two to three times, the xanthate solution thus obtained is worked up into any one of the shaped structures set forth above under (1) to (11).

X(13). The process is conducted as in X(12), but with the difference that, after having been treated with carbon bisulphide at room temperature for 2 to 10 hours, the reaction mass is cooled down to a temperature between room temperature and 0° C. or to 0° C. or to a temperature below 0° C., for example to minus 5° to minus 10° C., kept at this temperature for 20 to 30 minutes or even 1 to 2 hours with stirring, kneading or otherwise agitating and then brought back to room temperature.

X(14). The reaction mass resulting from the treatment of the alkali cellulose with ethyl chloride and ethylene chlorohydrin or monochlorohydrin or ethylene oxide is in the crude state or in the washed and pressed state mixed with such an amount of caustic soda solution of appropriate strength as to yield a mixture of 1000 parts of the cellulose derivative contained in the crude reaction mass or of the dry residue of the washed and pressed reaction mass and 15,666 to 11,500 parts of caustic soda solution of 6 to 9 per cent. strength. The mixture is now stirred at room temperature or at any temperature between room temperature and 0° C. or at 0° C. or at a temperature below 0° C. for 20 minutes to 2 hours, whereupon 300 parts of carbon bisulphide are added and the mixture added kept with stirring or agitating for 2 to 10 hours at room temperature. After that time 200 parts of carbon bisulphide are added and the mixture kept at room temperature for 3 to 4 hours with stirring or agitating.

The age of the solution at the time of converting it into artificial threads or film or the like is 80 to 105 hours at 15 to 18° C.

X(15). The process is conducted as in X(14), but with the difference that after the first stage of the xanthation and after the second stage of the xanthation the mixture is cooled down to minus 5 to minus 10° C. and kept at this temperature for 30 minutes to 2 hours, whereupon the solution thus obtained is brought back to room temperature.

X(16). The process is conducted as in any one of the Examples X(12) to X(15), but with the exception that, instead of 500 parts, only 350 parts (i. e., 35 per cent. calculated on the weight of the cellulose derivative) of carbon bisulphide are used.

In the event of the working condition X(14) or X(15) being used as basis, in the first stage the amount of carbon bisulphide is to be 200 parts and in the second stage 150 parts.

X(17). The process is conducted as in Example X(12) or X(13), but with the difference that, instead of 500 parts, only 200 parts of carbon bisulphide are used, the age of the final solution being 24 to 48 or 60 hours at 15 to 18° C.

X(18). The process is conducted as in Example X(12) or X(13), but with the difference that, instead of 500 parts, 140 to 160 parts of carbon bisulphide are employed, the age of the xanthate solution before converting it into shaped structures being 12 to 40 hours at 15 to 18° C.

X(19). The process is conducted as in Example X(12) or X(13), but with the difference that, instead of 500 parts, only 50 to 100 parts of carbon bisulphide are used and that the age of the solution before conversion into shaped structures is 10 to 36 hours at 15 to 18° C.

The desulphurisation or bleaching of the shaped structures, such as film, threads, etc. produced from the xanthates of the cellulose compounds made according to the present invention may be conducted in any manner known from the viscose art.

The shaped structures may also be desulphurised by any one of the processes described in my U. S. Patents Nos. 1,989,100, 2,004,875, 2,004,876 and 2,004,877.

The solutions of the xanthates described above are precipitable by means of ethyl or methyl alcohol, preferably under stirring. The thus obtained precipitates, when collected on a filter or a straining cloth or in a filter press or in a centrifuge, if desired washed with alcohol and, optionally, exhausted with ether and dried, are substances which are soluble in caustic alkali solution.

Prior to their conversion into shaped structures any suitable softening agents, such as an oxy-trimethylene sulphide (see my U. S. Patent No. 1,018,329) or glycerine or a glycol or a sugar, such as glucose or a sulphonated oil, such as Turkey-red oil or a drying or non-drying oil or any other known plasticising or softening agent, for example the substances with which viscose is contacted in my U. S. Patents 2,021,862, 2,021,863, 2,021,864, 2,051,051 and 2,087,981, and in my British Specifications Nos. 357,549 and 385,979 may be added to the solutions of the straight cellulose ethers or of their mixtures with cellulose xanthate or to the solutions of the xanthates of the cellulose derivatives produced according to the present invention.

C. The process is conducted as in Example A or B, but with the difference that, instead of 100 to 200 parts of ethylene chlorohydrin or 55 to 110 parts of ethylene oxide, 25 to 75 parts of ethylene chlorohydrin or 16 to 40 parts of ethylene oxide are used.

D. The process is conducted as in Example A or B or C, but with the exception that, instead of 200 to 1000 parts, 40 to 100 parts of ethyl chloride are used.

E. The process is conducted as in Example A or C or D, but with the difference that, instead of ethyl chloride an equimolecular proportion of di-ethyl sulphate is used, the temperature of the reaction being 40 to 65° C.

F. The process is carried out as in Example A or C or D or E, but with the difference that the reaction is conducted at 95° C.

G. The process is conducted as in any one of the Examples A and C to F, but with the exception that the duration of heating is only 3 to 6 hours.

H. The process is conducted as in any one of the Examples A to C, but with the difference that the alkali cellulose is allowed to mature for 12 to 96 hours or longer.

If there is no excess of the etherifying agents over the proportion calculated on the proportion of NaOH contained in the alkali cellulose, the reaction may be conducted at a temperature exceeding 100° C., for example at 110 to 130° C. or higher.

*Example IIA to H*

The process is conducted as in any one of the Examples IA to H, but with the difference that, instead of to 3,000 to 3,400, the alkali cellulose is pressed to 2,000 parts.

*Example IIIA to H*

The process is conducted as in any one of the Examples IA to H or IIA to H, but with the difference that, instead of the caustic soda solution of 18 per cent. strength, a caustic soda solution of 9 per cent. strength is used for the preparation of the alkali cellulose.

*Example IVA to H*

The process is conducted as in any one of the Examples IA to H or IIA to H, but with the difference that, instead of the caustic soda solution of 18 per cent. strength, a caustic soda solution of 5 per cent. strength is used for the preparation of the alkali cellulose.

*Example VA to H*

The process is conducted as in Example IA to H or IIA to H, but with the exception that, instead of the 18 percent. caustic soda solution a caustic soda solution of 5 to 9 per cent. is used and that the alkali cellulose is pressed to 1250 to 1350 parts.

*Example VIA to H*

The process is conducted as in Example IIIA to H or IVA to H or VA to H, but with the difference that, before being treated with the etherifying agent, the alkali cellulose is dried at room temperature or at 50 to 60° C., preferably at reduced pressure to constant weight or to weight between constant weight and the original weight.

*Example VIIA to H*

The process is conducted as in any one of the foregoing examples, but with the difference that the treatment with the ethylating agent on the one hand and with the hydroxyalkylating agent on the other, is performed in two consecutive steps which may be arranged to each other in either order.

Thus, the matured or unmatured alkali cellulose is treated (as described in the foregoing examples) is treated first with 50 to 100 or 100 to 500 or 500 to 1,000 parts of ethyl chloride at 50 to 95° C. for 6 to 12 hours or with an equimolecular proportion of di-ethyl sulphate at 40 to 65° C. for 1 to 6 hours.

After completion of the reaction, preferably after replacement of the proportion of caustic soda which has been used up in the reaction (which replacement is effected, for example, by adding to the reaction mass with stirring or kneading a quantity of a concentrated caustic soda solution, for example of 50 per cent. strength or of powdered caustic soda corresponding to, or in excess of the proportion of caustic soda that has been used up in the reaction) and, if desired, after having been allowed to mature, for example for 12 to 72 hours, the alkali ethyl cellulose thus obtained is treated with 50 to 200 parts of ethylene chlorohydrin or glycerol-alpha-monochlorohydrin or 25 to 110 parts of ethylene oxide or 50 to 100 parts of propylene oxide at 18 to 21° C. for 3 to 96 hours.

Instead of at 18 to 21° C., the reaction can also be conducted at 10° C. or lower.

The product of the reaction is dissolved and converted into shaped structures as described in Example I under *a* to *c* or under (1) to (11) respectively.

The product of the reaction may also be converted into its xanthate as described in Example I under X(1) to X(19) and any one of the solutions of the xanthates thus obtained may be worked up into artificial structures according to any one of the methods given in Example I under (1) to (11).

Instead of being prepared by steeping the cellulose in an excess of caustic alkali solution and removing the excess by pressing, in any one of the preceding examples the alkali cellulose may also be prepared by mixing the cellulose in a suitable mixing apparatus, for example a shredder or a kneading machine or a mill or a disintegrator or an edge runner or the like with the amount of caustic soda solution corresponding with the quantity remaining in the alkali cellulose used in the relative examples after pressing. The mixing of the cellulose with the caustic alkali solution may be conducted at room temperature or at a temperature above room temperature, for example at 24 to 30° C., or with cooling, for example to 15 or 10° C. or lower. The time of mixing may be varied within wide limits, for example from 1 hour to 24 hours or longer.

In the foregoing examples, any excess of the etherifying agents, which has not been used up in the reaction may be recovered by condensation or distillation.

The products of the foregoing examples are also soluble in the known solvents for cellulose, for instance such solvents as are enumerated in the eighth paragraph of the present specification.

In the foregoing examples, instead of cellulose, any conversion product of cellulose which is insoluble or only scarcely soluble in caustic alkali solution may be used as parent material, for instance a cellulose hydrate or a hydrocellulose produced by chemical action on cellulose, such as mercerisation with subsequent washing and, if desired, drying; or by treating with a strong inorganic or organic acid or a mixture of both; or by heating with a dilute solution of a mineral acid; or by treatment with a zinc halide; or by a mechanical process, such as grinding in presence of water, or the like; or an oxy-cellulose—in short any body of the cellulose group which has been proposed for the manufacture of viscose or of any other cellulose derivatives or compounds or of ammoniacal-copper-oxide-cellulose.

In the foregoing examples, a small amount of of a catalyser, for example of a metal salt, such as a copper salt, nickel salt, silver salt, zinc salt, iron salt, or a peroxide, for instance benzoyl peroxide or ammonia or primary, secondary or tertiary organic bases, such as a mono- or di-alkyl aniline or a mono-, di- or tri-alkyl amine or an aralkyl amine, or an oxy-alkyl amine or the like may be added to the alkali cellulose or reacting mixture.

If desired or expedient, in the foregoing examples, instead of the halogenated etherifying agents used therein, equivalent quantities of the corresponding brominated or iodinated reagents (for example ethyl bromides or ethyl iodides or monobromohydrin or monoiodohydrin or ethylene bromohydrin or ethylene iodihydrin) may be used.

If desired or expedient, in the foregoing examples, instead of the hydroxy-alkylating agents used therein, equivalent quantities of hydroxy-alkylating agents containing other hydroxy-alkyl groups can be used, for instance propylene chlorohydrin or butylene chlorohydrin.

If desired or expedient, instead of ethylene oxide, other alkylene oxides, such as propylene oxide or butylene oxide, in short all suitable compounds which contain an ethylene oxide ring, and also other cyclic ethers, for example glycid, can be used in the foregoing examples.

If desired or expedient, instead of alkyl halides or di-alkyl sulphates, equimolecular amounts of their substitution or addition derivatives, for example halogen alkyl amines, such as halogen-alkyl-di-alkyl amines or their hydrochlorides can be employed in the foregoing examples.

If desired, the extensibility of the shaped structures, such as threads or film or coatings or the like produced according to the present invention either from the straight cellulose compounds or from their xanthates may be increased by treating them either in the course of their manufacture, for example after coagulation and washing or in the finished wet or dry state with suitable shrinking agents, for example, with some of the shrinking agents mentioned in my U. S. Patents Nos. 1,989,098, 2,001,621, 1,989,100, 1,989,101, 2,004,875 and 2,004,877.

If feasible or expedient, in the foregoing examples the coagulating or precipitating baths described in my U. S. Patent No. 2,231,927 can be used in the working up of the products of the invention into shaped structures or other useful articles.

As a guiding line with regard to the question whether or not the alkali cellulose should be allowed to mature before being brought together with the etherifying agent or agents may, among others, serve the desired viscosity of the solution of the straight cellulose derivative or of its xanthate which is to be worked up into shaped structures in general and artificial threads in particular, and in connection therewith the viscosity of the kind of cellulose contemplated. If it is desired to give the solution a definite viscosity, then the alkali cellulose produced from the kind of cellulose contemplated is subjected to a maturing process, if without maturing this kind of cellulose yields a higher viscosity. If, however, it exhibits from the first the desired grade of viscosity that is without maturing, the maturing is superfluous. Now, as the viscosities of the different kinds of cellulose on the market (linters and wood-pulp) differ very much from one another, the question of maturing depends in most cases on the one hand on the viscosity desired of the initial solution intended for the manufacture of shaped structures, and on the other hand on the viscosity of the kind of cellulose being worked.

In the specification and claim wherever the context permits, the expressions "alkali-soluble cellulose derivative," "alkali-soluble cellulose ether," "cellulose derivative which is soluble or at least partially soluble in caustic alkali solution," "cellulose ether which is soluble or at least partially soluble in caustic alkali solution," "cellulose derivative which is at least partially soluble in caustic alkali solution" and "cellulose ether which is at least partially soluble in caustic alkali solution" are intended to include such cellulose ethers as are completely or almost completely soluble in caustic alkali solution. They in some cases will dissolve therein at room temperature, and in other cases will dissolve at a lower temperature, for example at a temperature between room temperature and 0° C. or lower. Often they will not dissolve directly in caustic alkali solution at room temperature but they can be brought into solution therein by cooling their suspensions or incomplete solutions in caustic alkali solution to a temperature between room temperature and 0° C. or to 0° C. or to a temperature below 0° C. for example to minus 5° C. or to minus 10° C. or lower and then the solution can be allowed to warm up, say to 0° C. or above 0° C. for example to a temperature between 0° and 20° C. Some of the cellulose ethers will not dissolve either in caustic alkali solution at room temperature nor at a temperature between room temperature and 0° C. or even at 0° C., but they can be brought into partial or complete solution therein by cooling their suspensions or incomplete solutions to a temperature below 0° C., for example to minus 5° C. or minus 10° C. or lower and then the temperature of the solution can be allowed to rise to 0° C. or above 0° C.

The term "cellulose" used in the description and claim is, wherever the context permits, intended to include cellulose, its conversion and oxidation products, such as cellulose hydrate, hydrocellulose, oxycellulose, acidcellulose and the like, in short, any body of the cellulose group which has been proposed as starting material for the preparation of cellulose derivatives or cellulose compounds of any kind.

The term "alkali cellulose," wherever the context permits, means alkali cellulose prepared in the usual manner, namely by steeping cellulose in caustic alkali solution and removing the excess of the latter by pressing or by mixing cellulose with such an amount of caustic alkali solution as is desired to be present in the final alkali cellulose.

The expression "etherification" in the specification and claim covers alkylation or aralkylation or hydroxyalkylation or production of hydroxy-acid derivatives, "ether" covers simple alkyl or aralkyl and hydroxy-alkyl or hydroxy-acid ethers and also mixed ethers, "etherifying agents" covers alkylating and aralkylating and hydroxy-alkylating agents and halogen fatty acids.

The expression "halohydrin" used in the specification and the claim includes, wherever the context permits, the compounds containing both at least one halogen and at least one hydroxyl group which may be regarded as being derived from a di- or polyhydroxy alcohol by a partial exchange of the hydroxyl groups for chlorine, bromine or iodine (or from a mono- or poly-hydroxy alcohol by the substitution of one or more hydrogen atoms in the alcohol radical), and the derivatives (such as the esters) or internal anhydrides (such as epichlorohydrin) of such halohydrins, or substances or mixtures of substances which are capable of yielding such halohydrins.

The term "hydroxy-alkyl" is intended to include the halogenated or non-halogenated radicals of di- or polyvalent alcohols in conjunction with one or more oxygens or hydroxyls.

The term "hydroxy-alkylating agents" is intended to include halogen derivatives of di- or polyhydric alcohols, particularly halohydrins, such as monohalohydrin and alkylene oxides.

In the present case, as is customary in the art, the terms "alkali-soluble" and "soluble in caustic alkali solution" are intended to mean that the cellulose ether can be dissolved in caustic soda solution of about 6% to about 10% concentration.

The expression "artificial structures" or "shaped structures" used in the specification and claim is intended to include: Artificial threads, particularly artificial silk and staple fibre, artificial hair, artificial straw, film of every kind, bands and plates of every kind, plastic masses of any description; adhesives and cement; finishes, coatings and layers of every kind, particularly such as are applicable in finishing, filling and dressing of textile fabrics, sizing of yarn, thickening agents or fixing agents for pigments in textile printing and the like; paper-like surfacing; paper-sizing; in the manufacture of artificial leather or of book-cloth or of tracing cloth or of transparent paper or of transparent cloth and the like.

The term "artificial threads" denotes artificial threads and spun goods of all kinds, for instance artificial silk, artificial cotton, artificial wool, artificial hair and artificial straw of any kind.

What I claim is:

An ethyl hydroxy-alkyl ether of cellulose which is insoluble in water, soluble in caustic soda solutions of about 6% to about 10% concentration, which ether is capable of forming an alkali-soluble xanthate by action of caustic alkali and carbon bisulphide, and which product is substantially identical with the product produced by treating cellulose as herein defined in the presence of caustic alkali with an ethylating agent and with a hydroxy-alkylating agent, wherein the treatment with the ethylating agent is conducted at a temperature above normal room temperature, both treatments being conducted in the presence of an amount of caustic alkali, calculated as caustic soda, that is substantially smaller than the weight of the water present.

LEON LILIENFELD.